(12) United States Patent
Allen et al.

(10) Patent No.: US 10,037,268 B2
(45) Date of Patent: *Jul. 31, 2018

(54) SYSTEM AND METHOD FOR DETERMINING REQUIREMENTS FOR TESTING SOFTWARE

(71) Applicant: International Business Machines Corporation, Armonk, NY (US)

(72) Inventors: Corville O. Allen, Morrisville, NC (US); Andrew D. Dingsor, Durham, NC (US); Joseph N. Kozhaya, Morrisville, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,845

(22) Filed: May 12, 2015

(65) Prior Publication Data

US 2016/0132423 A1    May 12, 2016

Related U.S. Application Data

(63) Continuation of application No. 14/539,234, filed on Nov. 12, 2014.

(51) Int. Cl.
*G06F 11/36* (2006.01)

(52) U.S. Cl.
CPC ...... *G06F 11/3696* (2013.01); *G06F 11/3684* (2013.01); *G06F 11/3688* (2013.01)

(58) Field of Classification Search
CPC .......... G06F 11/36–11/3696; G06F 8/60–8/68; H04W 24/00; H04W 24/06; H04W 24/08; H04B 17/20–17/29

(Continued)

(56) References Cited

U.S. PATENT DOCUMENTS

| | | | |
|---|---|---|---|
| 6,961,937 | B2 | 11/2005 | Avvari et al. |
| 7,299,452 | B1 * | 11/2007 | Zhang ................. G06F 17/2223 704/8 |
| 7,370,101 | B1 | 5/2008 | Lakkapragada et al. |
| 7,711,534 | B2 | 5/2010 | Devins et al. |

(Continued)

FOREIGN PATENT DOCUMENTS

| | | |
|---|---|---|
| CN | 103645989 A | 3/2014 |
| EP | 1963964 A2 | 9/2008 |
| WO | 2007070414 A2 | 6/2007 |

OTHER PUBLICATIONS

Fisher, "File Extension," About.com (online), 2013, downloaded Feb. 2, 2016, https://web.archive.org/web/20130329133042/http://pcsupport.about.com/od/termsf/g/file_extension.htm>, p. 1.

*Primary Examiner* — Todd Aguilera
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and system is provided for determining requirements for testing software. In an implementation, a method may include inspecting contents of a test case, including source code of the test case. The method may also include identifying at least one of: at least one characteristic of a test machine and at least one characteristic of a resource required to execute the test case correctly. The method may further include compiling a list of requirements for the test case to execute correctly based upon, at least in part, the at least one of the at least one characteristic of the test machine and the at least one characteristic of the resource.

4 Claims, 3 Drawing Sheets

(58) Field of Classification Search
USPC .......... 717/124–135; 714/38.1–38.14, 45, 46
See application file for complete search history.

(56) References Cited

U.S. PATENT DOCUMENTS

| | | | |
|---|---|---|---|
| 7,721,289 | B2 | 5/2010 | Remany et al. |
| 8,028,188 | B2* | 9/2011 | Karthikeyan ........... H04L 43/50 |
| | | | 455/423 |
| 8,166,458 | B2 | 4/2012 | Li et al. |
| 8,276,122 | B2 | 9/2012 | Allen et al. |
| 8,320,839 | B2* | 11/2012 | Huber ................... H04W 24/08 |
| | | | 370/245 |
| 8,874,968 | B1* | 10/2014 | Nilsson ............... G06F 11/3672 |
| | | | 714/38.1 |
| 2003/0120829 | A1 | 6/2003 | Avvari et al. |
| 2005/0096864 | A1 | 5/2005 | Bonilla |
| 2007/0168970 | A1 | 7/2007 | Li et al. |
| 2009/0307531 | A1* | 12/2009 | Karthikeyan ........... H04L 43/50 |
| | | | 714/38.1 |
| 2012/0254660 | A1 | 10/2012 | He et al. |
| 2013/0055029 | A1 | 2/2013 | Lawrance et al. |
| 2013/0152047 | A1 | 6/2013 | Moorthi et al. |
| 2015/0135158 | A1* | 5/2015 | Tenev ................. G06F 11/3684 |
| | | | 717/101 |
| 2016/0132422 | A1* | 5/2016 | Allen ................. G06F 11/3684 |
| | | | 714/38.1 |

* cited by examiner

SYSTEM AND METHOD FOR DETERMINING REQUIREMENTS FOR TESTING SOFTWARE

RELATED APPLICATIONS

The subject application is a continuation application of U.S. patent application with Ser. No. 14/539,234, filed on Nov. 12, 2014, the entire content of which is herein incorporated by reference.

TECHNICAL FIELD

The present disclosure generally relates to testing software, and more particularly relates to systems and methods for determining requirements for testing software.

BACKGROUND

Testing software during a development cycle may be challenging. The larger the software package, the more individual source and/or executable modules to be tested, the more challenging the problem may become. Thousands of tests may be run. Analyzing the requirements for each test to specify test machines and resources required to execute the tests may be very time consuming.

SUMMARY OF DISCLOSURE

According to an implementation, a computer-implemented method may include inspecting contents of a test case, including source code of the test case. The method may also include identifying at least one of: at least one characteristic of a test machine and at least one characteristic of a resource required to execute the test case correctly. The method may further include compiling a list of requirements for the test case to execute correctly based upon, at least in part, the at least one of the at least one characteristic of the test machine and the at least one characteristic of the resource.

One or more of the following features may be included. The method may further include inspecting contents of a product-under-test, including source code of the product-under-test. The method may also include inspecting an environment under which the product-under-test is run, including different versions of operating systems. The method may further include inspecting metadata associated with the test case and the product-under-test, including property files associated with the test case and the product-under-test.

The method may further include accessing at least one of: at least one test machine with the at least one characteristic of the test machine and at least one resource with the at least one characteristic of the resource.

The method may also include installing the product-under-test on at least one of: the at least one test machine and the at least one resource. The method may further include executing the test case on the at least one of the at least one test machine and the at least one resource.

According to another implementation, a computer program product includes a computer readable medium having a plurality of instructions stored on it. When executed by a processor, the instructions may cause the processor to perform operations including inspecting contents of a test case, including source code of the test case. Instructions may also be included for identifying at least one of: at least one characteristic of a test machine and at least one characteristic of a resource required to execute the test case correctly. Instructions may also be included for compiling a list of requirements for the test case to execute correctly based upon, at least in part, the at least one of the at least one characteristic of the test machine and the at least one characteristic of the resource.

One or more of the following features may be included. Instructions may be included for inspecting contents of a product-under-test, including source code of the product-under-test. Instructions may further be included for inspecting an environment under which the product-under-test is run, including different versions of operating systems. Instructions may also be included for inspecting metadata associated with the test case and the product-under-test, including property files associated with the test case and the product-under-test.

Instructions may be included for accessing at least one of: at least one test machine with the at least one characteristic of the test machine and at least one resource with the at least one characteristic of the resource.

Instructions may also be included for installing the product-under-test on at least one of: the at least one test machine and the at least one resource. Instructions may further be included for executing the test case on the at least one of the at least one test machine and the at least one resource.

According to another implementation, a system may include at least one processor device and at least one memory architecture coupled with the at least one processor device. The at least one processor device may be configured for inspecting contents of a test case, including source code of the test case. The at least one processor may also be configured for identifying at least one of: at least one characteristic of a test machine and at least one characteristic of a resource required to execute the test case correctly. The at least one processor may further be configured for compiling a list of requirements for the test case to execute correctly based upon, at least in part, the at least one of the at least one characteristic of the test machine and the at least one characteristic of the resource.

One or more of the following features may be included. The at least one processor may further be configured for inspecting contents of a product-under-test, including source code of the product-under-test. The at least one processor may also be configured for inspecting an environment under which the product-under-test is run, including different versions of operating systems.

The at least one processor may further be configured for accessing at least one of: at least one test machine with the at least one characteristic of the test machine and at least one resource with the at least one characteristic of the resource.

The at least one processor may further be configured for installing the product-under-test on at least one of: the at least one test machine and the at least one resource. The at least one processor may also be configured for executing the test case on the at least one of the at least one test machine and the at least one resource.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
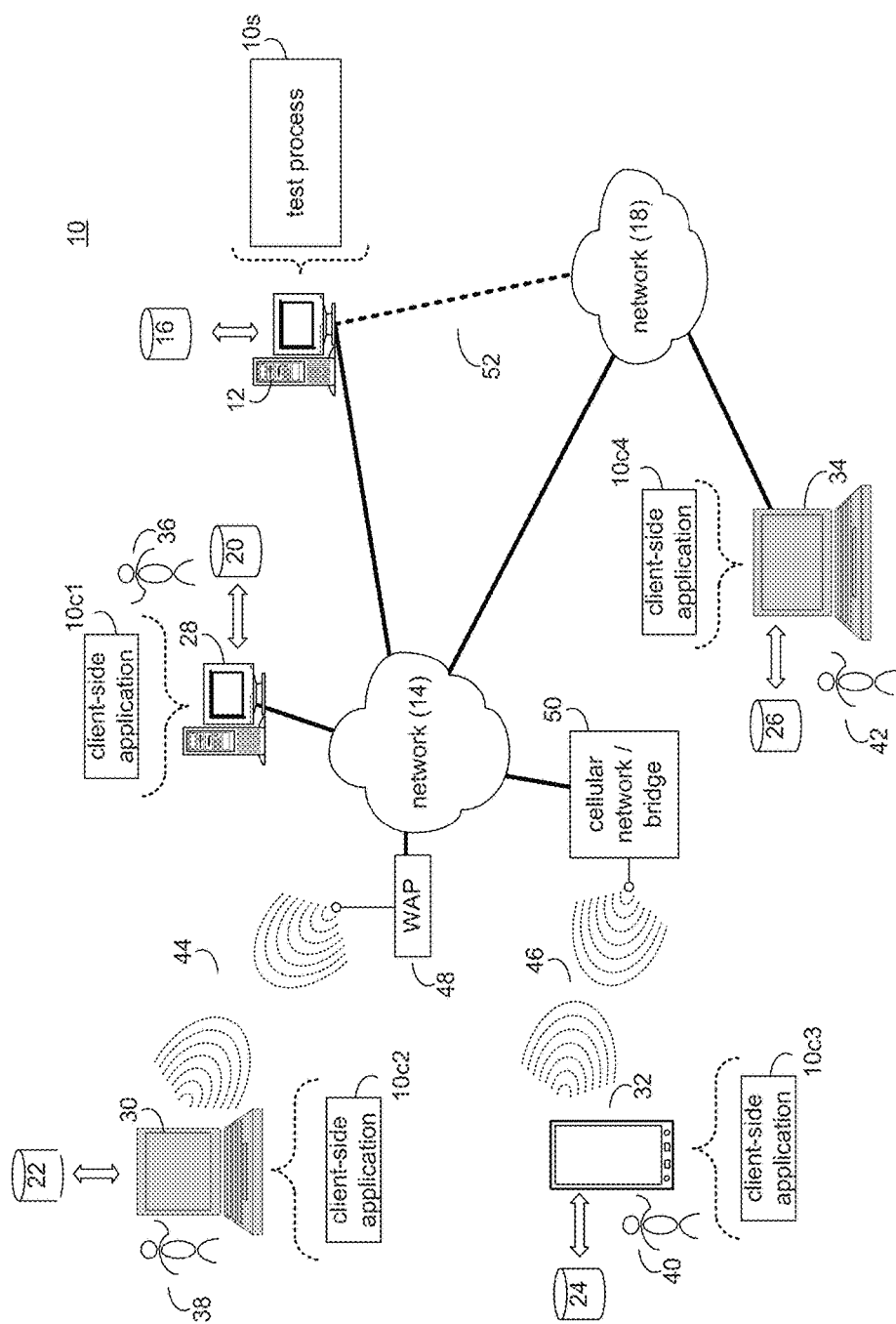
FIG. 1 is a diagrammatic view of a distributed computing network including a computing device that executes a test process according to an implementation of the present disclosure.

Referring to FIG. 1, there is shown test process 10. For the following discussion, it is intended to be understood that test process 10 may be implemented in a variety of ways. For example, test process 10 may be implemented as a server-side process, a client-side process, or a server-side/client-side process.

For example, test process 10 may be implemented as a purely server-side process via test process 10s. Alternatively, test process 10 may be implemented as a purely client-side process via one or more of client-side application 10c1, client-side application 10c2, client-side application 10c3, and client-side application 10c4. Alternatively still, test process 10 may be implemented as a server-side/client-side process via test process 10s in combination with one or more of client-side application 10c1, client-side application 10c2, client-side application 10c3, and client-side application 10c4. In such an example, at least a portion of the functionality of test process 10 may be performed by test process 10s and at least a portion of the functionality of test process 10 may be performed by one or more of client-side application 10c1, 10c2, 10c3, and 10c3.

Accordingly, test process 10 as used in this disclosure may include any combination of test process 10s, client-side application 10c1, client-side application 10c2, client-side application 10c3, and client-side application 10c4.

Figure 2:
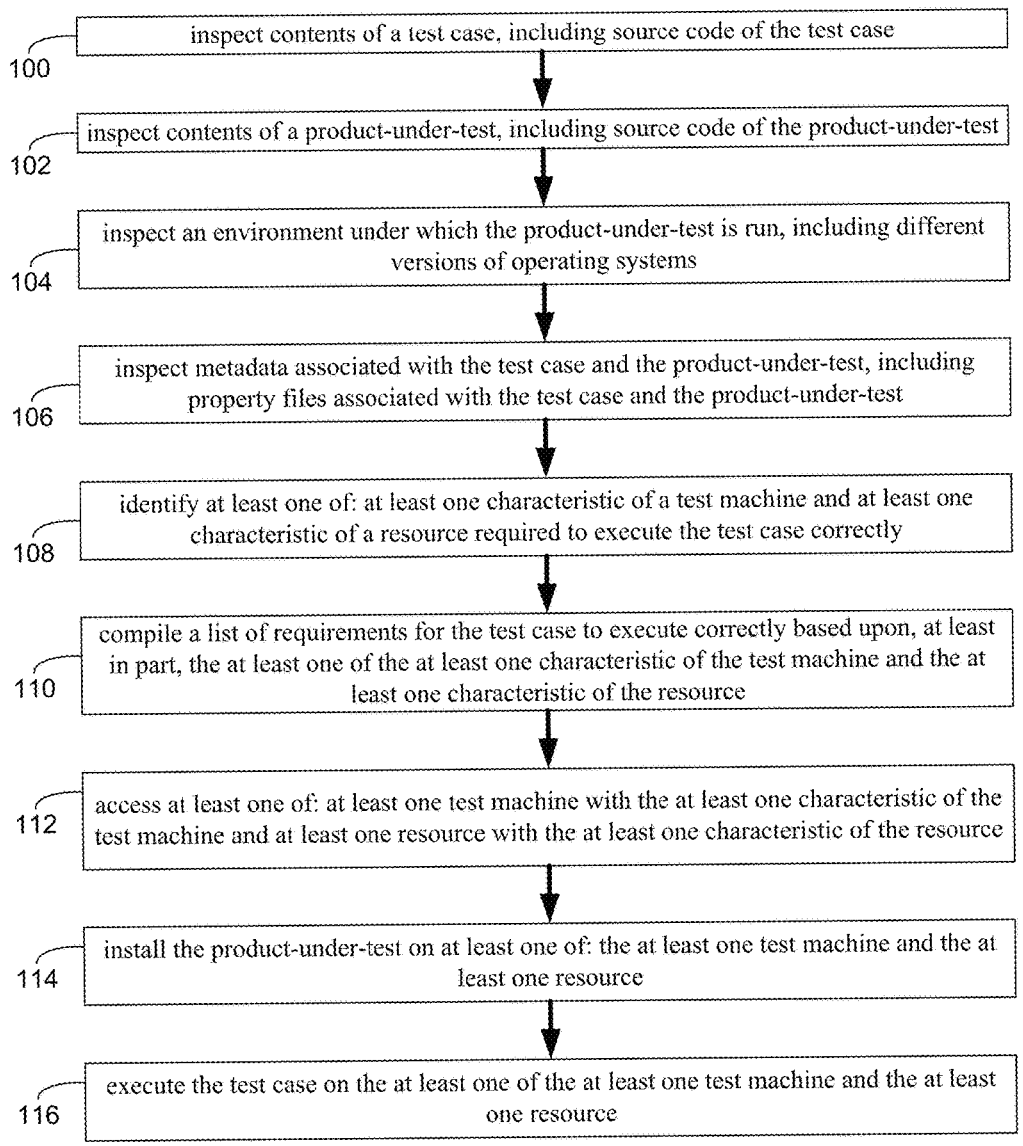
FIG. 2 is a flowchart of the test process of FIG. 1, according to an implementation of the present disclosure.

Referring also to FIG. 2, and as will be discussed in greater detail below, test process 10 may inspect 100 contents of a test case, including source code of the test case. Test process 10 may also identify 108 at least one of: at least one characteristic of a test machine and at least one characteristic of a resource required to execute the test case correctly. Test process 10 may also compile 110 a list of requirements for the test case to execute correctly based upon, at least in part, the at least one of the at least one characteristic of the test machine and the at least one characteristic of the resource.

Test process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of test process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access test process 10 directly through network 14 or through secondary network 18. Further, test process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 48. Similarly, mobile computing device 32 is shown wirelessly coupled to network 14 via wireless communication channel 46 established between mobile computing device 32 and cellular network/bridge 50, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 44 between laptop computer 30 and WAP 48. Additionally, personal computer 34 is shown directly coupled to network 18 via a hardwired network connection.

As generally discussed above with reference to FIG. 2, test process 10 may inspect 100 contents of a test case, including source code of the test case. Test process 10 may also identify 108 at least one of: at least one characteristic of a test machine and at least one characteristic of a resource required to execute the test case correctly. Test process 10 may also compile 110 a list of requirements for the test case to execute correctly based upon, at least in part, the at least one of the at least one characteristic of the test machine and the at least one characteristic of the resource.

Test process 10 may inspect 100 contents of a test case, including source code of the test case. A test case may be an automated test that may be executed to test a product. In some implementations, each line of each source code file included within the test case may be inspected 100 by test process 10 to identify 108 at least one of: at least one characteristic of a test machine and at least one characteristic of a resource required to execute the test case correctly. Contents of the test case source code that test process 10 may inspect may include, but are not limited to, application server installables (e.g., web application archive (WAR) files, etc.), mobile application installables (e.g., ANDROID application package (APK) files, etc.), and server configuration files (e.g., APACHE TOMCAT configuration files, etc.). (ANDROID is a registered trademarks of Google, Inc.). (APACHE, and TOMCAT are registered trademarks of the Apache Software Foundation). Further contents of the test case source code that test process 10 may inspect may include, but are not limited to, operating system utilities included in shell scripts and batch files and operating system names mentioned in the test case. An example of an operating system name that may be included in the test case may include, but is not limited to, a particular version of an operating system, such as "WINDOWS 7". (WINDOWS 7 is a registered trademarks of Microsoft Corporation). As such, in general the at least one characteristic of a test machine required to properly execute the test case may include hardware requirements and operating system requirements which may be required for the proper execution of the test case. Test machine limitations may also be included within the test case source code, such as memory limitations (e.g., "2 GB RAM"). Further resource requirements of the test case may also be included in the source code, database tables, and shell scripts. The at least one characteristic of a resource required to execute the test case correctly may include file system space requirements, network connectivity, and specific software services (e.g., logging and monitoring). For example, network and database requirements may be included within shell scripts (e.g., Internet Protocol Version 6 address, MYSQL, etc.). Test process 10 may inspect 100 any and all contents of the test case, including source code of the test case, for any information indicative of requirements for the test case to execute properly.

Examples of characteristics and/or resources of test machines may include, but are not limited to, test machine CPU type (e.g., INTEL 386, POWERPC, etc.), test machine bus width (e.g., 32, 64, etc.), test machine memory (e.g., 2 GB, 4 GB, etc.), test machine available disk space (e.g., 100 GB, etc.), test machine operating system (e.g., UBUNTU LINUX, MAC OS, WINDOWS Windows XP, etc.), language packs installed on the test machine (e.g., English, French, Chinese, Hebrew, etc.), and type of test machine (e.g., physical or virtual). (INTEL is a registered trademark of the Intel Corporation). (POWERPC is a registered trademark of the IBM Corporation). (UBUNTU is a registered trademark of Canonical Ltd). (MAC is a registered trademark of Apple, Inc.). (WINDOWS XP is a registered trademarks of Microsoft Corporation). (LINUX is a registered trademark of the LINUX Software Foundation). Further characteristics and resources of test machines may include, but are not limited to, attached physical peripheral devices (e.g., keyboard, mouse, display, CD/DVD, etc.), attached physical mobile device (e.g., APPLE IPHONE, ANDROID tablet, etc.), installed mobile device emulators (e.g., APPLE XCODE, ANDROID emulator, etc.), installed software tools (e.g., C-language compiler, JAVA interpreter, SSH server, etc.), and installed application programs (e.g., DB/2 database, APACHE TOMCAT application server, etc.). (JAVA is a registered trademark of Sun Microsystems, Inc.). (APPLE, IPHONE and XCODE are registered trademarks of Apple, Inc.).

Test cases may require different test machines and/or resources to execute properly. For example, a test case for installation of an application upon WINDOWS XP may require a test machine with WINDOWS XP operating system. Further, a test case for an ANDROID mobile application may require a machine with an ANDROID mobile device or emulator. A test case for application behavior when low on memory may require a test machine that has limited memory. A test case for a JAVASCRIPT hybrid mobile application in French may require a mobile device with French language support installed. Further, a test case for a mobile application behavior in an area with poor network coverage may require a mobile device located in a shielded room, cage, or remote area.

Test process 10 may inspect 102 contents of a product-under-test, including source code of the product-under-test, wherein the test case tests the product-under-test. The product-under-test may include, for example, a software application, a software module, a suite of software modules, and/or any collection of software applications or portions of software application that may be tested by the test case, e.g., to identify defects (e.g., bugs), such as operational failures and security vulnerabilities. The product-under-test may be a simple application or even a single file. The product-under-test may be installed to a machine, or it may be installed in a cloud environment for testing. In some implementations, each file included within the product-under-test may be inspected 102 by test process 10 to identify 108 at least one of: at least one characteristic of a test machine and at least one characteristic of a resource required to execute the test case correctly. As generally discussed above with respect to the test case, the at least one characteristic of a test machine may include hardware requirements and operating system requirements. Similarly, the at least one characteristic of a resource may include file system space requirements, network connectivity, and specific software services. Contents of the product-under-test that test process 10 may inspect 102 may include, but are not limited to, JAVA libraries imported into source files of the product-under-test, dependent packages listed in build files of the product-under-test, and version numbers of the product-under-test. (JAVA is a registered trademark of Sun Microsystems, Inc.). Test process 10 may inspect 102 any and all contents of the product-under-test, including source code of the product-under-test, for any information indicative of requirements for the test case to execute properly.

Test process 10 may inspect 104 an environment under which the product-under-test is run, including different versions of operating systems. For example, it may be appreciated that multiple versions of the same general software product (e.g., the product-under-test) may be produced, which may be configured to execute in different computing environments. An example of different environments under which the different version of the same general software product may be executed may include different operating systems, and/or different versions of an operating system. In some implementations, the environment under which the product-under-test may be inspected 104 by test process 10 to identify 108 at least one of: at least one characteristic of a test machine and at least one characteristic of a resource required to execute the test case correctly. Environments under which the test may run that test process 10 may inspect 104 may include, but are not limited to, test machines with different versions of different operating systems (e.g., different versions of WINDOWS operation systems, etc.), mobile devices with different versions of mobile device operating systems (e.g., different versions of ANDROID operating systems), and various language packs installed on various test machines and mobile devices (e.g., English, French, Spanish, Hebrew, etc.). Test process 10 may inspect 104 any and all environments under which the product-under-test may be run, including different versions of operating systems, for any information indicative of requirements for the test case to execute properly.

Test process 10 may inspect 106 metadata associated with the test case and the product-under-test, including property files associated with the test case and the product-under-test. In some implementations, the metadata associated with the test case and the product-under-test may be inspected 106 by test process 10 to identify 108 at least one of: at least one characteristic of a test machine and at least one characteristic of a resource required to execute the test case correctly. Property files associated with the test case and the product-under-test may include listing requirements for the test case to execute properly. The listing requirements included within the property files associated with the test case and the product-under-test may have been created, either manually or automatically, and saved as a reference to past requirements for the test case to execute properly. For example, configuration files may include a name of a particular browser, which may indicate that the particular browser included within the configuration files by name may be required for the test case to execute properly. Other examples may include, but are not limited to, web application xml descriptor files, deployment descriptor files that may be embedded within the product-under-test, and cloud deployment configuration files. Test process 10 may inspect 106 any and all metadata, including property files associated with the test case and the product-under-test, for any information indicative of requirements for the test case to execute properly.

In an embodiment, test process 10 may identify 108 at least one of: at least one characteristic of a test machine and at least one characteristic of a resource required to execute the test case correctly. Test process 10 may identify 108 that at least one of the at least one characteristic of the test machine and the at least one characteristic of the resource required to execute the test case correctly based upon, at least in part, one or more of the inspected 100 contents of the test case, inspected 102 contents of the product-under-test, inspected 104 environment under which the product-under-test is run, and inspected 106 metadata associated with the test case and the product-under-test. As generally discussed above with respect to the test case, the at least one characteristic of the test machine may include hardware requirements and operating system requirements. Further, the at least one characteristic of the resource may include file system space requirements, network connectivity, and specific software services.

Test process 10 may compile 110 a list of requirements for the test case to execute correctly based upon, at least in part, the at least one of the at least one characteristic of the test machine and the at least one characteristic of the resource. The compiled 110 list of requirements may be saved as a resource for requirements for future testing of the test case.

Based upon, at least in part, the compiled 110 list of requirements for the test case to execute correctly, test process 10 may identify at least one test machine with the at least one characteristic of the test machine and/or at least one resource with the at least one characteristic of the resource required for the test case to execute correctly. A plurality of test machines and resources may be available for use to test the product-under-test with the test case. In order for the test case to execute properly, test machines and resources that include the at least one characteristic of the test machine and/or the at least one characteristic of the resource may be identified out of the plurality of test machines and resources.

Test process 10 may access 112 at least one of: at least one test machine with the at least one characteristic of the test machine and at least one resource with the at least one characteristic of the resource. The at least one resource may be available on the at least one test machine. For example, a platform for serving static web content to the internet may include the APACHE HTTP Server. Often times, the main configuration file associated with the APACHE HTTP Server is named "httpd.conf". If test process 10 inspected 100 contents of the test case and found "httpd.conf", test process 10 may identify 102 that the test case may require a test machine with APACHE HTTP Server to execute the test case correctly. Test process may identify test machines out of the available plurality of test machines that include the APACHE HTTP Server and access 112 at least one test machine of the identified test machines that includes the APACHE HTTP Server.

In another example, ANDROID mobile applications are often included in filenames which ends with a suffix of "apk" (e.g., "testapp.apk"). (ANDROID is a registered trademarks of Google, Inc.). If test process 10 inspected 100 contents of the test case and found a file ending in "apk", test process 10 may identify 102 that the test case may require a test machine with an ANDROID device or emulator to execute the test case correctly. Further, ANDROID applications may include version information in a file named "AndroidManifest.xml". Test process 10 may inspect 100 contents of the "AndroidManifest.xml" file and identify 102 the supported versions of an ANDROID device or emulator required to execute the test case correctly. Test process may identify test machines out of the available plurality of test machines that include the supported versions of the ANDROID device or emulator and access 112 at least one test machine of the identified test machines that includes the supported versions of the ANDROID device or emulator.

As discussed above, if a test case for a JAVASCRIPT hybrid mobile application in French requires a mobile device with French language support installed on it, test process 10 may identify test machines out of the available plurality of test machines that have installed French language support and access 112 at least one test machine of the identified test machines that includes the installed French language support.

In an embodiment, test process 10 may install 116 the product-under-test on at least one of: the at least one test machine and the at least one resource. The product-under-test may be ready to be tested by the test case once the product-under-test is installed 116 on the accessed 112 at least one test machine and/or the accessed 112 at least one resource.

Test process 10 may further execute 118 the test case on the at least one of the at least one test machine and the at least one resource. By executing 118 the test case on the at least one test machine and/or the at least one resource, test process 10 may test the product-under-test installed 114 on the at least one test machine and/or the at least one resource with the test case. The test case may execute 118 correctly because at least one test machine and/or at least one resource were identified and accessed 112 with the required at least one characteristic of the test machine and/or at least one characteristic of the resource.

In an embodiment, the systems and methods described herein may also apply to running an application. Contents of an application may be inspected to determine the types of machines and resources required to run the application. For example, a service application may require use of a particular type of database, such as MONGODB, to properly operate. If a filed named "mongo*.conf" was identified during inspection of the service application contents, it may indicate that the service application may require use of an environment that includes that particular database (e.g., MONGODB).

Figure 3:
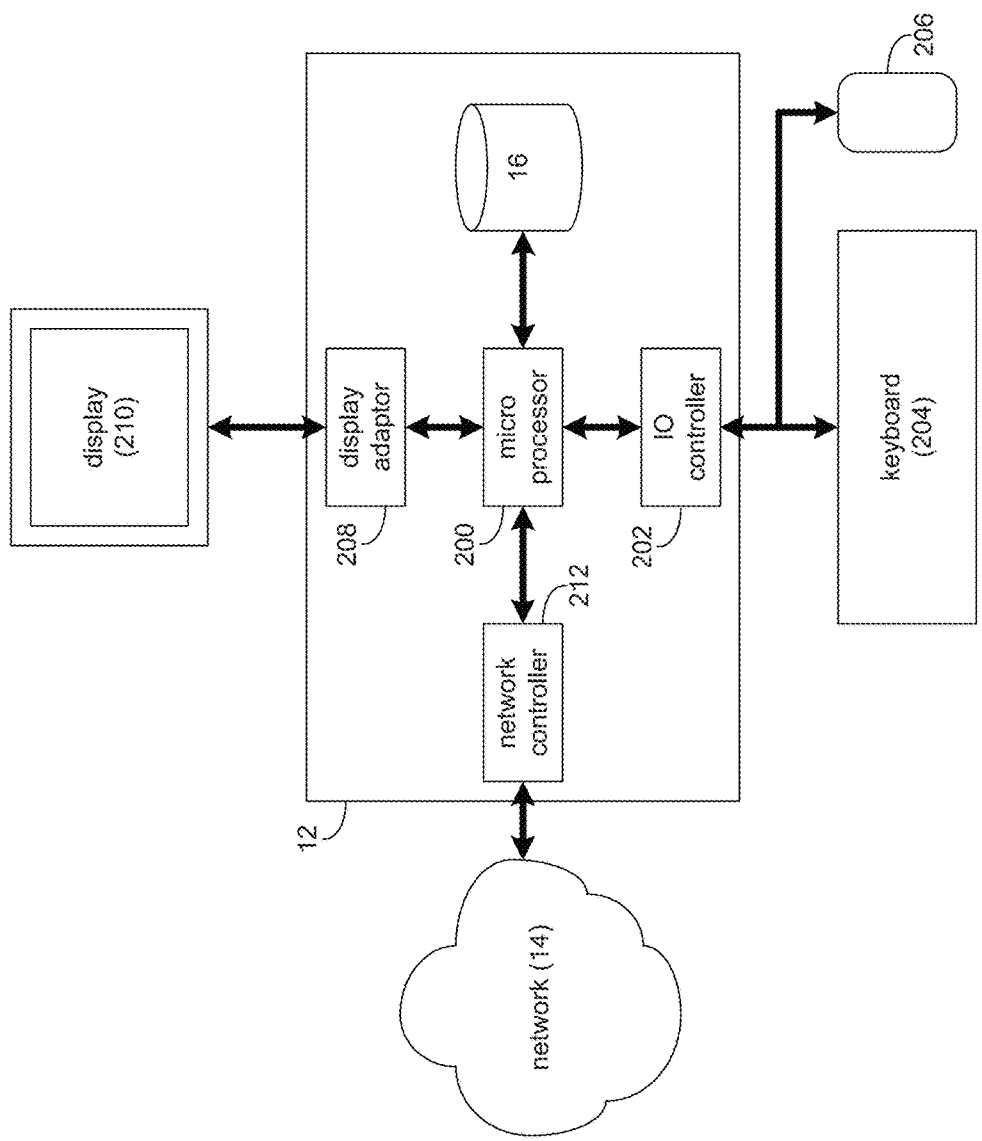
FIG. 3 is a diagrammatic view of the computing device of FIG. 1, according to an implementation of the present disclosure.

Referring also to FIG. 3, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, test process 10 may be substituted for computing device 12 within FIG. 3, examples of which may include but are not limited to client electronic devices 28, 30, 32, 34.

Computing system 12 may include microprocessor 200 configured to e.g., process data and execute instructions/code for test process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    inspecting, by a processor, contents of a product-under-test, including source code of the product-under-test and source code of a test case, including property files associated with the test case and the product-under-test, wherein the test case tests the product-under-test, wherein the inspection of the source code of the test case includes inspection of each source code file included within the test case;
    identifying, by the processor, at least one characteristic of a test machine and at least one characteristic of a resource required to execute the test case correctly based upon the inspection of the source code of the product-under-test and the source code of the test case, wherein the at least one characteristic of the resource required to execute the test case correctly includes one or more foreign language support packages and wherein the at least one characteristic of the test machine includes a location of the test machine in a limited network coverage environment including one or more of a shielded room and a cage;
    compiling, by the processor, a list of requirements for the test case to execute correctly based upon, at least in part, the at least one characteristic of the test machine and the at least one characteristic of the resource identified based upon the inspection of the source code of the product-under-test and the source code of the test case, wherein the list of requirements for the test case to execute correctly include hardware and operating system requirements identified based upon the inspection of the source code of the product-under-test and the source code of the test case;
    saving the list of requirements for the test case to execute correctly within the property files as a reference to past requirements to execute the test case correctly; and
    executing the test case, based upon, at least in part, the list of requirements, on at least one test machine that includes the at least one characteristic of the test machine and at least one resource that includes the at least one characteristic of the resource required to execute the test case correctly.

2. The computer-implemented method of claim 1, further including:
    inspecting an environment under which the product-under-test is run, including different versions of operating systems.

3. The computer-implemented method of claim 1, further including:
    installing the product-under-test on at least one of: the at least one test machine and the at least one resource.

4. The computer-implemented method of claim 1, wherein the at least one characteristic of the resource required to execute the test case correctly includes one or more network connectivity requirements.

* * * * *